United States Patent

[11] 3,604,765

| [72] | Inventor | David H. Babcock |
| | | Lexington, Ky. |
| [21] | Appl. No. | 835,363 |
| [22] | Filed | June 23, 1969 |
| [45] | Patented | Sept. 14, 1971 |
| [73] | Assignee | International Business Machines Corporation |
| | | Armonk, N.Y. |

[54] SELF-ALIGNING BEARING
8 Claims, 6 Drawing Figs.

[52] U.S. Cl.......... 308/15,
135/25, 308/238
[51] Int. Cl.... F16c 13/00,
F16c 27/00
[50] Field of Search.......... 135/25;
308/15, 238 N, 238; 252/12, 12.2

[56] References Cited
UNITED STATES PATENTS

| 2,855,377 | 10/1958 | Stott.............. | 252/12 |
| 3,372,960 | 3/1968 | Fisher............. | 308/15 |
| 3,431,203 | 3/1969 | Hartmann........ | 252/12.2 |
| 3,467,115 | 9/1969 | Brooks et al...... | 135/25 |

FOREIGN PATENTS

| 819,111 | 8/1959 | Great Britain...... | 308/15 |
| 1,011,067 | 4/1952 | France............. | 308/15 |
| 1,140,945 | 3/1957 | France............. | 308/15 |

Primary Examiner—William F. O'Dea
Assistant Examiner—Wesley S. Ratliff, Jr.
Attorneys—Hanifin and Jancin and David M. Bunnell ABSTRACT: A self-aligning bearing is constructed on the principle of a four-bar linkage. The bearing comprises a foundation, a bearing element, and a series of connecting struts which are flexibly joined to the foundation and bearing element.

PATENTED SEP 14 1971 3,604,765

INVENTOR.
DAVID H. BABCOCK

BY David M. Bunnell
ATTORNEY.

SELF-ALIGNING BEARING

BACKGROUND OF THE INVENTION

Self-aligning bearings such as spherical and diaphragm bearings, which can adjust for a certain degree of misalignment of the shafts which they support, are well known in the art. Although useful in many applications, these bearings have certain disadvantages. For example, spherical bearings exert a binding force on the shaft when aligning themselves and do not properly align themselves to adjust for small misalignments of the shaft unless a special aligning force is applied to them. Diaphragm bearings cannot withstand moderate thrust loads. This invention provides a self-aligning bearing which aligns itself with a minimum of binding force on the shaft for the small angles normally encountered in shaft misalignment, which can withstand high thrust loads, and which can be conveniently made of unitary construction.

BRIEF DESCRIPTION OF THE INVENTION

In accordance with this invention, there is provided a self-aligning bearing comprising a foundation, a bearing element, and struts flexibly connecting the bearing element and the foundation. The connecting struts are arranged such that the point of intersection of their longitudinal axes approximately coincides with the center of the bearing element when the bearing element is in the nominal position, but such that the longitudinal axes do not coincide.

The foregoing and other objects, features, and advantages of the invention will be apparent from the following more particular description of preferred embodiments of the invention as illustrated in the accompanying drawings.

DETAILED DESCRIPTION

Figure 1:
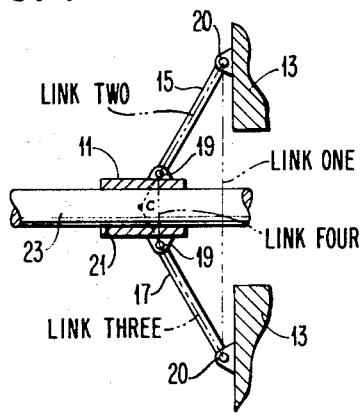
FIG. 1 is a fragmentary elevational view partially in section showing an assembly including a bearing device incorporating the features of the invention.
Figure 2:
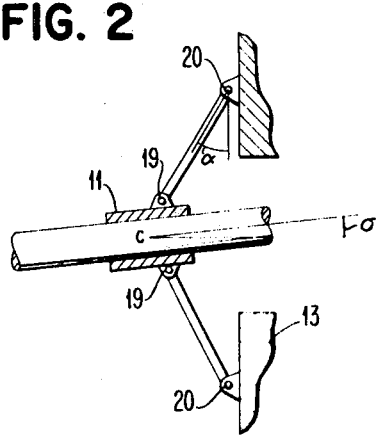
FIG. 2 is a fragmentary elevational view partially in section of the device of FIG. 1 illustrating the self-aligning features.

Turning now to FIG. 1, bearing element 11 is flexibly connected to foundation 13 by struts 15 and 17 which are of approximately equal length. Struts 15 and 17 are pivotally connected between element 11 and foundation 13 at points 19 and 20. Element 11 has a cylindrical aperture 21 through its center which is adapted to receive and support shaft 23 for rotation. The longitudinal axis of struts 15 and 17 shown as dashed lines intersect at the center C of element 11. The bearing operates on the principle of a four-bar linkage. Link one is formed by the foundation, links two and three are formed by struts 15 and 17 and link four is formed by the bearing element 11 between points of connection 19. The instant center of rotation of link four corresponds with the center C of bearing element 11 when no shaft deflection exists. When the shaft is deflected to a position such as that shown in FIG. 2, the element 11 will pivot very nearly about point C, with only a negligible displacement of point C as compared with the displacement of the instant center of link four. The hinged portion 20 need only permit a slight angle of deflection to permit a large displacement angle in the angle of the shaft from its nominal position with a minimum of binding force being exerted on the shaft for small angles of shaft deflection.

Figure 3:
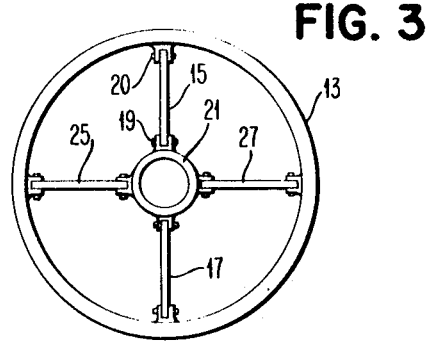
FIG. 3 is an end view of the device of FIG. 1.

As shown in FIG. 3, two pairs of struts 15 and 17 and 25 and 27 which are disposed at an angle of about 90° to each other provide for uniform and flexible support of the shaft in all directions. The struts are constructed of somewhat flexible material so that the struts which are more normal to the direction of the deflecting force on the shaft will twist as the bearing element 11 deflects so as to keep the forces on the shaft being supported to a minimum.

The bearings of the invention can be fabricated by joining parts of any suitable materials which provide strength, flexibility, wear resistance, and lubrication for the shaft. Conveniently the bearing can be made of a plastic material, such as, for example, nylon and olefin polymers. The use of plastic permits the bearing to be molded in a unitary construction with integral hinged portions of plastic having reduced cross section being formed at the points 19 and 20 of connection of the struts with element 11 and foundation 13. The hinged portion 19 undergoes an angle of deflection equal to the sum of the shaft deflection (angle $\sigma$) plus the small angle of deflection at the hinged portion 20. Thus the plastic hinge at point 19 must be designed to provide for greater flexibility than that at point 20. This can be easily done as described below.

Struts 15, 17, 25, and 27 extend outwardly at an angle from the point of connection with foundation 13 to the points of connection with element 11. This permits the bearing to withstand thrust loads in the direction of the axis of the shaft as well as the vertical loads tending to displace the shaft from its nominal axis. If the struts were connected in a vertical manner (where links one, two, and three would coincide), then the structure would have poor resistance to thrust loads being similar in this respect to a diaphragm-type bearing. The angle the struts should make with the foundation can be determined by one skilled in the art depending upon the projected use of the bearing. A convenient method for choosing the optimum angle for a given application is to choose the angle of the resultant vector obtained from combining the vertical load vector and the thrust load vector which vectors represent the forces to which the bearing will be subjected during use.

The struts must be constructed to permit flexibility with respect to one another. For example, if the struts were merged to form the surface of a cone, a structure would result which is too rigid and the property of self-alignment is lost. Ideally, the number of struts for maximum flexibility and support in all directions would approach infinity. As a practical matter, the number of struts are chosen to provide the proper column strength, depending upon the strut material used, to enable the bearing to withstand the anticipated vertical and thrust loads to which it will be subjected during use.

For purposes of discussion and exploration, it is convenient to consider the struts as functioning in pairs, but it should be understood that this device will also work with an odd number of struts—three or more.

Figure 4:
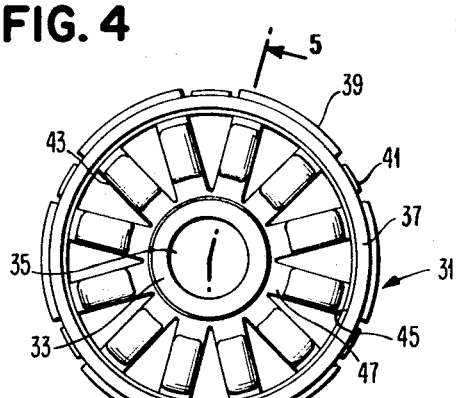
FIG. 4 is an elevational end view of another embodiment of the apparatus of the invention.
Figure 6:
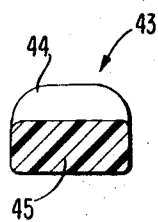
FIG. 6 is a sectional view taken through lines 6—6 of FIG. 5.
Figure 5:
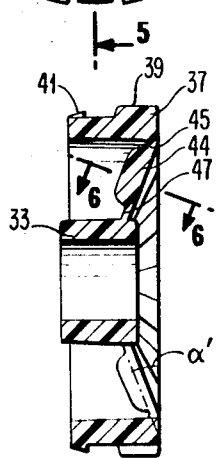
FIG. 5 is a cross-sectional view of the apparatus of FIG. 4 taken through lines 5—5.

In the embodiment of the invention shown in FIGS. 4, 5, and 6, bearing 31 is molded as a unitary structure of a plastic polymer material, for example, nylon polyamide filled with molybdenum disulfide. The bearing 31 comprises a bearing element 33, with a central aperture 35 for receiving and supporting a shaft for rotation, and a foundation 37. Foundation 37 has a series of mounting shoulders 39 and 41. Element 33 and foundation 37 are connected by 12 struts 43. Struts 43 are of a rounded somewhat semicircular cross section in their center portion 44 with necked down portions at points 45 and 47 to provide integral hinged flexible connections between the struts 43 and the foundation 37 and bearing elements 33 as shown in FIG. 5. The angle $\alpha'$ is chosen to provide the proper resistance against thrust and vertical loading which in the illustrated embodiment is approximately 68°. Where greater resistance to thrust loads is needed, then the angle is progressively decreased with a corresponding diminishing in resistance to vertical loads and vice versa.

FIG. 6 illustrates an end view of a strut 43 showing the center portion 44 and a cross section of the hinge portion 45 of strut 43 which connects the strut with foundation 37. The cross section of the hinge portions 45 and 47 are made equal and as thick as required to withstand loading on the strut, but the length of hinge portion 47 is made to be considerably greater than that of 45 to allow for the greater angular deflection at 47, compared with 45, for a given shaft deflection. In the embodiments of the invention which have been illustrated, the parts are arranged symmetrically with the struts having approximately equal lengths and being connected to the bearing elements such that their longitudinal axes intersect at about the center of the bearing elements. This represents an ideal construction from which the maximum benefits of the structure of the device of the invention are obtained but it should be realized that some deviation from the ideal can be introduced and still provide a suitable structure.

The bearings of the subject invention have great flexibility for small shaft deflection angles which permits instant adjustment to deviations of the shaft from the normal position with a minimum of loading on the shaft and wear on the bearing. The bearings are strong and can be constructed to be capable of withstanding any desired combination of weight and thrust loads by varying the angle of connection of the struts between the bearing element and the foundation. The bearings are compact and easily adapted to be molded of a unitary structure.

I claim:

1. A self-aligning bearing comprising a relatively fixed foundation, a bearing element, and struts flexibly connecting said bearing element and said foundation,
    said connecting struts being arranged such that the points of intersection of their longitudinal axes approximately coincide with the center of said bearing element when said bearing element is in the nominal position and being arranged such that the longitudinal axes of said struts do not coincide.

2. A self-aligning bearing comprising a relatively fixed foundation a bearing element, and at least a pair of struts flexibly connecting said bearing element with said foundation,
    said connecting struts being arranged such that to form a four-bar linkage with said foundation and said bearing element.

3. The apparatus of claim 2 in which said connecting struts are arranged such that the point of intersection of their longitudinal axes approximately coincides with the center of said bearing element when said bearing element is in the nominal position.

4. The apparatus of claim 1, wherein there are at least three struts,
    said struts being of approximately equal length.

5. The apparatus of claim 2, wherein said bearing element struts and foundation are of unitary construction.

6. The apparatus of claim 5, wherein said apparatus is molded from a flexible organic polymer.

7. The apparatus of claim 6, wherein said polymer is a polyamide filled with particles of a solid lubricant.

8. The apparatus of claim 6, wherein said polymer is a sintered polyamide impregnated after molding with a liquid lubricant.